Jan. 12, 1965

K. M. POOLE 3,165,696

COLLECTOR VOLTAGE CONTROL CIRCUIT FOR TRAVELING WAVE TUBE EMPLOYED IN A RADIO REPEATER

Filed March 17, 1961

2 Sheets-Sheet 1

INVENTOR
K. M. POOLE
BY Reg M. Porter Jr.
ATTORNEY

INVENTOR
K. M. POOLE
BY Roy M. Porter, Jr.
ATTORNEY 3,165,696
Patented Jan. 12, 1965

3,165,696

COLLECTOR VOLTAGE CONTROL CIRCUIT FOR TRAVELING WAVE TUBE EMPLOYED IN A RADIO REPEATER

Kenneth M. Poole, New Providence, N.J., assignor to Bell Telephone Laboratories, Incorporated, New York, N.Y., a corporation of New York Filed Mar. 17, 1961, Ser. No. 96,490
14 Claims. (Cl. 325—4)

This invention relates to electron discharge devices and, more particularly, to power conservation in traveling wave tubes.

The extremely broadband, low noise, high power characteristics of traveling wave tubes have made them an ideal choice as the power amplifier in certain of the most advanced, large capacity, long-haul, ground installed microwave communications systems. In such systems, the traveling wave tubes are generally operated continuously with a high collector voltage at repeater stations receiving operating power from local power company lines. There are other applications contemplated for these tubes, however, such as in mobile and certain active, space satellite systems, wherein the tubes would be operated only intermittently or periodically at high power and with self-contained power supplies. In such applications, direct-current power consumption often may prove to be a very important factor to consider in the design of any given system. Especially is this true in satellite repeaters, wherein solar cells appear at present to be the most promising type of power sources available.

In these latter applications, periodic operation of the traveling wave tube between high power and low power or quiescent states would make possible a substantial saving in direct-current power consumption. This follows from the fact that the collector draws substantially all of the power (exclusive of heater power) in a traveling wave tube and the minimum value of this power increases directly and sharply with the radio-frequency power output of the tube (or with input drive). The increase in direct-current power consumption results from the necessity of having to increase the collector voltage as the power output increases so as to insure the collection of substantially all of the electrons said, thereby, prevent damage to the interaction circuit through electron impingement.

Accordingly, whenever it is desired to operate a traveling wave tube alternately or periodically between a high radio-frequency power output state and a low power output or quiescent state, a considerable saving in direct-current power consumption can only be effected if the collector voltage is in some manner substantially reduced during the periods when there is little or no appreciable power output.

As the collector voltage must change very rapidly between a high power and low power state if the tube is to operate properly, the collector voltage control circuit should either be actuated by a command signal synchronized with the signal information to be amplified or in some other manner made responsive to the presence or absence of the signal itself.

In addition, as the amplitude of the input signal is determinative of the power output level, it would also be advantageous if the collector voltage control circuit could maintain the collector voltage at a minimum value continuously optimized with respect to the particular value of power output (or input drive) produced by the tube.

A very beneficial collateral function of a traveling wave tube having two controlled operable states would be, in combination with appropriate feedback circuitry, to generate or amplify continously low power oscillatory energy at a frequency removed from the signal frequency, such as for the mixers of a satellite repeater and/or to actuate other auxiliary circuitry.

It has been suggested heretofore that the high value of collector voltage necessary for high levels of radio-frequency power output could be applied to the traveling wave tube in an active satellite only in response to an external command signal, a much lower voltage being applied to the collector at all other times. Problems relating to the reliability, sensitivity, weight and complexity of such an external command system are not easily resolved in practice. Likewise, whether or not such a commond system would be immune either from intentional or accidental interference is particularly questionable.

Moreover, an external ground command system would necessitate that the collector voltages be pre-established for optimum tube efficiency prior to launching of the satellite. As a result, the progressively higher values of collector voltage that might become necessary as the tube aged dictated primarily by a progressively decreasing uniformity of cathode emission, would have to be estimated and accommodated for in the initial settings. Accordingly, the collector voltages initially would necessarily have to be set at values higher than those required for optimum efficiency over the major portion of the useful life of the tube.

Accordingly, it is an object of this invention to conserve direct-current power supplied to a traveling wave tube amplifier during periods when alternately or intermittently operated either in a low power or quiescent state.

It is a more specific object of this invention to reduce direct-current power consumption in traveling wave tubes operating alternately between a high power and a low power or quiescent state through an appropriate change in collector voltage effected by an internal control parameter.

It is an additional object of this invention to maintain continuously the collector voltage at a value with respect to power output in a traveling wave tube such that optimum efficiency and an optimum saving in direct-current power is maintained throughout the active life of the tube.

It is still a further object of this invention to utilize a high power traveling wave tube, during periods when signal energy is not applied thereto for amplification, as a low power device providing radio-frequency energy for controlling and/or effecting an operable function in auxiliary circuitry.

These and other objects of my invention are attained with a collector voltage control circuit which effectively comprises a servo-loop responsive to a variable, internal operating parameter of a traveling wave tube.

More specifically, for reasons pointed out in greater detail hereinafter, intercepted current in a high power traveling wave tube normally increases directly with the radio-frequency power output (or with input drive) for a constant value of collector voltage. Heretofore, this has only proven to be a detriment, requiring that the collector voltage be progressively increased with input drive so as to prevent the intercepted current from reaching a value which would damage the interaction circuit. In accordance with an aspect of this invention, however, the variable intercepted current is advantageously utilized in a unique manner to detect the presence or absence of signal energy and to function as a control parameter to actuate suitable voltage control circuitry to raise or lower the collector voltage depending on the operating condition of the tube.

According to specific illustrative embodiments of the invention, the control circuitry includes a collector power supply with a saturable transformer, the degree of saturation being made to vary inversely with changes in intercepted current. More specifically, the transformer is designed such that a control winding therein is saturated to a maximum value, resulting in a minimum collector voltage, when the intercepted current is lowest (no signal applied) and to a very low value of saturation, resulting in a maximum initial collector voltage, when the intercepted current reaches a maximum tolerable value corresponding to maximum radio-frequency power output. As such, the collector voltage can be reduced substantially whenever signal energy is not applied to the tube for amplification which results in a considerable saving in direct-current power consumption.

The control circuits as embodied herein are also seen to be responsive exclusively to an internal electrical parameter of the tube itself, i.e., the intercepted current. As compared to a collector voltage control circuit responsive to an external command signal, the instant invention appears to afford greater immunity from external interference and improved sensitivity. It also appears to involve more simplified and reliable circuitry requiring less weight.

In addition, by designing the control circuit such that the initial maximum value of collector voltage is established while the transformer is partially saturated, the circuit can advantageously compensate for decreasing uniformity of cathode emission (as a result of tube aging) in establishing the minimum values of collector voltage for both the high and low power operating conditions. The reasons for this will be described in greater detail hereinafter.

In accordance with another aspect of my invention in one illustrative application, the cathode voltage control circuit is utilized to provide two operable states for a traveling wave tube employed in an active satellite repeater. In one operable state with an applied signal and a high collector voltage, the tube is utilized as both the power amplifier and a low power oscillator in the repeater whereas in the second operable state with no signal energy applied and with a very low value of collector voltage, the tube still functions as a local oscillator to provide oscillatory energy for the mixers of the repeater and/or for actuating telemetry circuitry. Such an application is particularly advantageous in satellite communications systems wherein the active satellite repeaters are only utilized to re-amplify and transmit signal energy periodically or intermittently.

A complete understanding of this invention and of these and other features thereof may be gained from a consideration of the following detailed description taken in conjunction with the accompanying drawing, in which.

Figure 1:
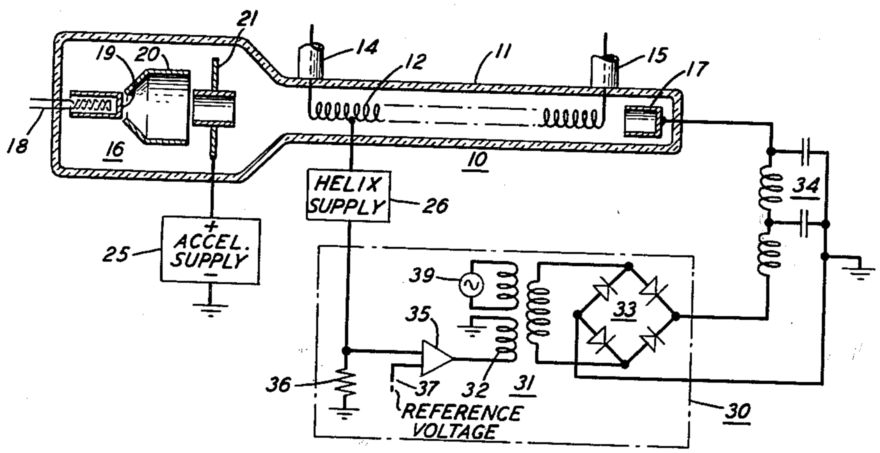
FIG. 1 is a schematic illustration of a traveling wave tube with a collector voltage control circuit embodying the principles of this invention.

Referring now more particularly to FIG. 1, there is depicted in schematic form a traveling wave tube 10 comprising an evacuated envelope 11, an interaction circuit 12 in the form of an elongated helical delay line, input and output signal transducers 14 and 15, shown by way of example as coaxial lines and an electron gun 16 and a collector 17 for producing and projecting an electron beam along an axial path therebetween. The electron gun 16 normally comprises, as shown, a heater element 18, a cathode 19, a beam forming electrode 20 and an accelerating electrode 21. A magnetic focusing structure would generally be utilized to confine the beam along its axial path of flow but has not been shown herein both for reasons of simplicity and inasmuch as it is not essential to an understanding of the invention.

As depicted in FIG. 1, the accelerating electrode 21 and helix 12 are biased positively by voltage supplies 25 and 26, respectively. By way of example, in a traveling wave tube amplifier designed for efficient operation at 6 kmc, typical potentials for the various electrodes would be of the order of zero volts for the cathode 19 and beam forming electrode 20, 2,600 volts for the accelerating electrode 21, 2,400 volts for the helix and 1,200 volts for the collector 17. These values of voltage may vary considerably in a given tube and those given herein are to be considered only as representative.

In accordance with a feature of the invention, the intercepted current is utilized in a unique manner to detect the presence or absence of signal energy. It is also utilized as a control parameter to actuate voltage control circuitry to raise or lower the collector voltage accordingly. In addition, the value of collector voltage is advantageously made dependent on the value of intercepted current. To this end, any suitable control circuitry that is responsive to small changes in current and, in accordance with these changes, is capable of varying a direct-current voltage may be applicable in accordance with the principles of this invention. In one specific illustrative embodiment, the aforementioned results are effected with a collector voltage control circuit 30, depicted within the dashed lined box, comprising a saturable alternating-current power transformer 31 with a saturable control winding 32 associated therewith. Alternating-current power is supplied to the transformer 31 from a source 39 which, in certain mobile and satellite applications, would include direct-current to alternating-current circuitry. A full wave bridge rectifier 33 and an L-C filter network 34 are utilized to provide the predetermined value of direct-current voltage to the collector 17.

While the saturable control winding 32 has been illustrated as being on the primary side of the transformer for reasons of simplicity, it is to be understood that such a winding often may be on the center leg of a three-legged core of a commercially sold transformer. Such a transformer, for example, is disclosed in J. A. Potter Patent 2,423,114, issued July 1, 1947. The function of the saturable control winding is to allow a small value of unidirectional current to control a large amount of direct-current power across the secondary terminals of the transformer. Specifically, varying the unidirectional current flowing in the control winding 32 directly affects the flow of current through the primary and secondary alternating-current windings of the transformer 31 by changing the saturation of the core and, hence, the reactive impedances of these alternating-current windings.

The degree of saturation of the transformer 31 is determined by the magnitude of the output of a direct-current amplifier 35. This amplifier has an input from a biasing resistor 36 in series with the helix power supply 26 and an input from a direct-current reference voltage 37. The direct-current amplifier 35 may be of either the difference or summation type depending on the polarity of the reference voltage. The choice of resistance for resistor 36 will of course determine the value of helix current at which the circuit will come to equilibrium, i.e., the point at which an increase or decrease in helix current will effect a change in the degree of transformer saturation and, concomitantly, a change in collector voltage.

In practice, the biasing resistance and reference voltage are preferably chosen such that with no radio-frequency signal energy applied to the traveling wave tube, the biasing voltage across resistor 36 in combination with the reference voltage 37 produce a maximum output from the direct-current amplifier capable of effecting a desired maximum value of saturation in transformer 31. As the induced secondary voltage of a saturable transformer varies inversely with the degree of saturation, the rectified direct-current collector voltage likewise will always attain a minimum value whenever transformer saturation is maximum and vice versa.

The reasons why control circuit 30 (as well as control circuit 40 described hereinafter) can advantageously compensate for the normally adverse effects attendant with tube aging will now be considered. As the uniformity of cathode emission decreases with tube aging, a progressive degradation in beam focusing is also experienced. This in turn results in an increase in the value of intercepted current for a given value of collector voltage. It is significant to note, however, that because of the phenomenon of space charge limiting, a decrease in uniformity in cathode emission with tube aging does not mean that the beam current density must necessarily decrease. Rather, it means that in order to draw an amount of current from the cathode for a given degree of nonuniformity of emission which is equal to the initial current drawn with uniformity of emission, the initial maximum value of collector voltage generally must be increased to some higher predetermined value.

Accordingly, the increase in intercepted current experienced with tube aging is advantageously utilized as a compensating control parameter in accordance with the principles of the invention to increase the collector voltage in a predetermined manner. In order to effect an increase in collector voltage from the initially chosen value applicable for a cathode exhibiting uniformity of emission, the initial value of voltage should be established with the transformer partially saturated rather than unsaturated. As such, the further increases in intercepted current above the initially chosen equilibrium value will effect a further reduction in the degree of transformer saturation and, hence, a further increase in collector voltage. In this manner, the control circuit can advantageously maintain the collector continuously at a voltage necessary to provide both optimum tube efficiency in the high power state and a very substantially saving in direct-current power in a low power or quiescent state over at least the major portion of the life of the tube.

Figure 2:
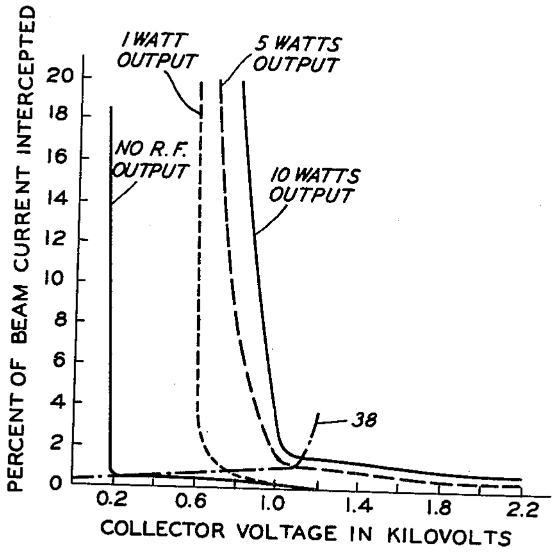
FIG. 2 is a graph illustrating, for purposes of better understanding the principles of this invention, the variation in intercepted current as a function of collector voltage for different levels of radio-frequency power output in a typical, ultra high frequency traveling wave tube amplifier.

In order to understand more fully how intercepted current varies with radio-frequency power output (or with input drive) in a traveling wave tube and how this effect is utilized in accordance with the invention, reference is made to the curves depicted in FIG. 2. These curves, illustrating the percentage variation of intercepted helix current as a function of collector voltage for various levels of radio-frequency power output, are applicable to one particular traveling wave tube amplifier. Accordingly, the curves in FIG. 2 are only intended to be illustrative of the intercepted current versus collector voltage characteristics of traveling wave tube amplifiers in general. The minimum value, of collector voltage that may be utilized with no radio-frequency power output is seen in FIG. 2 to be approximately 200 volts whereas the same value of intercepted current at 5 watts output necessitates a collector voltage of approximately 2,000 volts. The cause for the very abrupt change in intercepted helix current at the knee of each of the curves is attributed, in part, to the phenomenon of space charge blocking adjacent the collector. Specifically, as the collector voltage is progressively lowered, the space charge density adjacent the collector increases because of the decrease in electron velocity at this point. Increasing the charge density causes the potential depression in the beam to increase until at some collector voltage the potential on the axis is reduced to cathode potential. At collector voltages lower than this, some of the beam is blocked, i.e., it is turned back by the space charge fields and impinges on the helix and possibly even the accelerating anode under adverse conditions.

Another factor determinative of the minimum value of collector voltage that may be employed in a given traveling wave tube is the degree of velocity spread of electrons. Whenever a traveling wave tube is operated with appreciable radio-frequency input drive, the collector voltage must be increased to a value which permits the collection of all electrons which have been slowed down by the radio-frequency interaction. Unfortunately, some electrons are slowed down far more than the average under high power conditions, so that several times more direct-current power must be supplied to the traveling wave tube than can be taken from it in the form of radio-frequency power.

It is thus seen that in a typical traveling wave tube amplifier, the lowest permissible collector voltage with no radio-frequency drive is determined primarily by the phenomenon of space charge blocking whereas with a radio-frequency input, it is determined mainly by the degree of velocity spread of electorns. Regardless of the theoretical justification for the shape of the curves depicted in FIG. 2, their primary importance with respect to this invention is in illustrating why the intercepted helix current may advantageously be utilized as a unique control parameter.

The dot-dash line 38 in FIG. 2 might best be described as the "current-voltage" line along which the tube operates between the conditions of zero output and maximum output. With the value of intercepted current and collector voltage predetermined near the knee of the curve for either zero or very low power output, appropriate values of biasing resistance and reference voltage for a given saturable transformer necessary to effect the two desired operable conditions may be arrived at in a straight-forward manner. The rate of ascent of the operating line 38 will of course depend primarily on the sensitivity of the saturable transformer to changes in unidirectional current flowing in the control winding. A gradual slope as indicated would certainly be applicable when a direct-current amplifier is utilized in the control loop as depicted in circuit 30 of FIG. 1. After the tube has reached maximum power output, the control circuit may be designed such that the operating line 38 rises with a high slope, since further increase of collector voltage will not significantly decrease the value of intercepted current. It is further noted, in reference to the curves of FIG. 2, that the decrease in uniformity of cathode emission with tube aging, which also results in an increase in intercepted current, because of a degradation in focusing, as pointed out above, has the effect of gradually shifting the power level curves to the right. As seen above, however, this effect is utilized to advantage in accordance with the principles of this invention.

In certain applications, depending on the duty cycle of the circuit, it may be desirable to set the equilibrium point for helix current at a value which will effect a degree of transformer saturation and, in turn, establish a collector voltage, which is higher than the minimum value that could be tolerated with no radio-frequency drive. This will insure that the collector voltage will reach the maximum value desired before the tube attains full radio-frequency power output and remain constant over a broader range of output power levels.

It is further noted that in applications where the same or a similar value of voltage may be utilized for the accelerating electrode and helix, there appears to be no significant objection to the use of a composite helix-accelerating anode power supply, i.e., to allow the anode current which is negligible and does not vary with radio-frequency power output appreciably, to flow through the helix biasing resistor 36. As such, the separate accelerating anode power supply 25 depicted in FIG. 1 could be eliminated or combined with the helix power supply.

Figure 3:
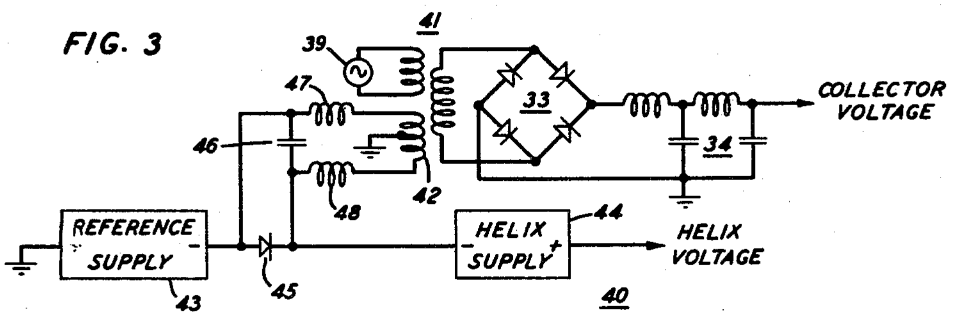
FIG. 3 is a diagrammatic illustration of an alternative collector voltage control circuit embodying the principles of this invention.

FIG. 3 illustrates an alternative collector voltage control circuit 40 embodying the principles of the invention. Circuit elements in FIG. 3 which correspond to those of FIG. 1 are identified by like reference numerals. Circuit 40 differs from control circuit 30 primarily in the elimination of the direct-current amplifier 35. This is accomplished by utilizing loop-gain obtained magnetically rather than through direct-current amplification. Specifically, transformer 41 utilizes a dual saturable control winding 42 rather than the single winding 32 of control circuit 30. Unidirectional current is applied to one terminal side of the dual control winding 42 from a reference direct-current voltage supply 43 which has its positive terminal grounded. Unidirectional current is also applied to the opposite terminal of the control winding through a series path from the negative terminal of the helix power supply 44 to the grounded center tap terminal of the control winding.

The components for control circuit 40 are chosen such that when the intercepted helix current is at its maximum value, it is sufficient to cancel the reference current either completely or to a degree which produces the desired minimum amount of transformer saturation initially and concomitantly, the desired maximum value of collector voltage necessary for high radio-frequency power operation. Conversely, when the intercepted helix current flowing through the helix power supply is at a minimum value, the circuit components should be chosen such that the unbalance of the unidirectional currents flowing through the dual control winding will produce a desired maximum degree of transformer saturation so as to lower the collector voltage to a minimum tolerable value for low-level or zero value power output.

The control circuit 40 is thus seen to function such that any increase in intercepted helix current from a negligible value will tend to buck the reference current until a point is reached whereat the two currents in the dual winding 42 cancel each other such that a desired minimum value of transformer saturation is effected. On the other hand, any decrease in helix current below that value established by the reference source will establish a progressively increasing unbalance between the two currents and an increase in transformer saturation.

As an appreciable increase in helix current above the reference value must not be allowed to affect the degree of saturation in the transformer, a clamp diode 45, backbaised with respect to the helix power supply 44, is inserted between the reference and voltage supplies and, as such, is positioned across the terminals of the transformer. A filter comprising a capacitor 46 and inductors 47 and 48 are utilized to isolate any power line signals from the radio-frequency helix circuit, reference supply 43 and clamp diode 45.

It should be noted that the saturable control winding 42 has been depicted as a dual winding with a grounded center tap on the primary side of the transformer 41 only for purposes of illustration. As mentioned with respect to circuit 30, control winding 42 in an actual saturable transformer would more than likely comprise a winding on the center leg of a three-legged core. Moreover, the features of the instant invention are also applicable to a transformer winding arrangement wherein the dual control winding 42 depicted in FIG. 3 would actually comprise two separate control windings wound with opposite pitch so as to be in field-opposing relation. It is quite apparent that such modified arrangements would alter the degree of transformer saturation in the same manner as is effected with the described control circuit 40 depicted in FIG. 3.

Figure 4:
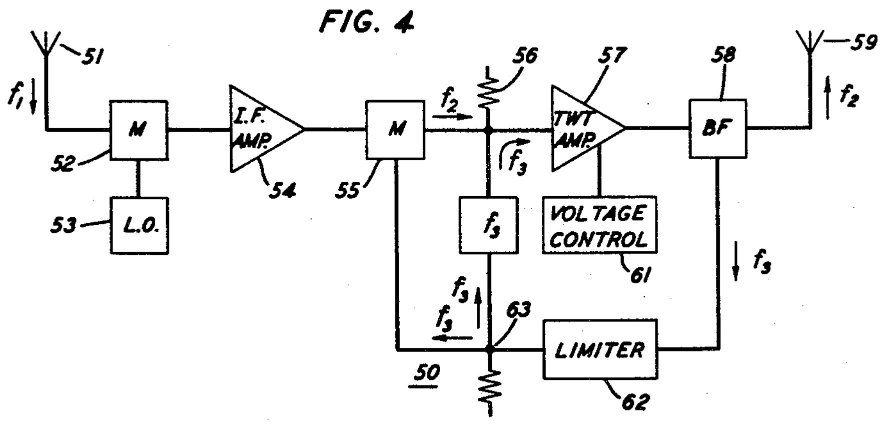
FIGS. 4 and 5 are block diagram representations of several particular applications of a traveling wave tube utilizing the collector voltage control circuit as embodied in the invention in active, satellite repeaters.

FIG. 4 illustrates, in block diagram form, one particular application for a traveling wave tube amplifier utilizing a collector voltage control circuit of the types embodied herein. More specifically, FIG. 4 depicts one particular arrangement of a so-called straight-through I–F repeater 50 which is applicable to space satellite communications systems. In such a repeater, the incoming signal at a frequency $f_1$ from the receiving antenna 51 is passed through a down-converter or mixer 52, having a local oscillator 53 associated therewith, so that the signal is at a more suitable I–F frequency for amplification. The I–F signal is then passed through an I–F amplifier 54 and then shifted in frequency, preferably to a new radio-frequency $f_2$, in the up-converter or mixer 55. The source of local oscillations for mixer 55 will be considered in greater detail hereinafter. The radio-frequency signal at a frequency $f_2$ is then passed through a directional coupler 56 (or a branching filter) before being applied to a traveling wave tube amplifier 57. The amplified signal at the output of the traveling wave tube is then passed through a branching filter 58 to the radiating or transmitting antenna 59. Generally in such a repeater, the I–F amplifier 54, the up and down converters 52 and 55 and the low power frequency shift oscillator 53 would all comprise solid state devices.

As shown in FIG. 4, a collector voltage control circuit 61 embodying the features of this invention is associated with the traveling wave tube power amplifier 57 to detect the presence or absence of signal energy and to effect a change in collector voltage accordingly. In addition, this circuit is also utilized in repeater 50 to establish a minimum value of collector voltage sufficient for the traveling wave tube, in a low power condition, to generate local oscillatory power for the up-converter 55 as well as any other auxiliary circuitry. The importance of generating local oscillatory power in this manner when direct-current power consumption is critical may be better appreciated from an examination of the most practical alternative approach. To supply approximately 10 milliwatts of oscillatory power to the up-converter, as required in a typical active repeater, approximately 3 to 5 watts of primary power would have to be applied to an alternative transistor or crystal oscillator-harmonic generator combination. The two operable states of the traveling wave tube and its broadband characteristics are thus seen to be used to excellent advantage in repeater 50.

Considering the low power oscillator function of the tube in greater detail, a portion of the radio-frequency output in passing through the branching filter 58 of a frequency $f_3$ is fed back through a limiter 62 and directional coupler 63 to the up-converter 55 and to the traveling wave tube input through a filter $f_3$ and directional coupler 56. It is apparent that a branching filter could be utilized in place of directional coupler 56. The gain around the feedback loop is adjusted such that once oscillations are initiated, the gain is maintained at unity. In practice, additional circuitry would also preferably be incorporated in this feedback loop to provide sensitive low-loss limiting.

A collector voltage control circuit of the types embodied herein are thus seen to provide two very important functions in a satellite repeater of the type depicted in FIG. 4. First, such a circuit can detect the presence or absence of signal energy with an internal control parameter, namely, helix current, and raise and lower the collector voltage accordingly to conserve direct-power. Moreover, the determination of minimum collector voltage levels takes into account tube aging since the intercepted helix current varies with the uniformity of cathode emission. Secondly, the control circuit may also be utilized to adjust appropriately the value of collector voltage necessary to provide low-level oscillatory energy for either the up-converter and/or actuating telemetry or other types of auxiliary circuitry during the standby periods of operation. It should of course be noted that the oscillatory energy produced at a frequency $f_3$ could also be suitably mixed with a very low power frequency shift oscillator so as to provide the primary local oscillator source for both the up and down converters.

Figure 5:
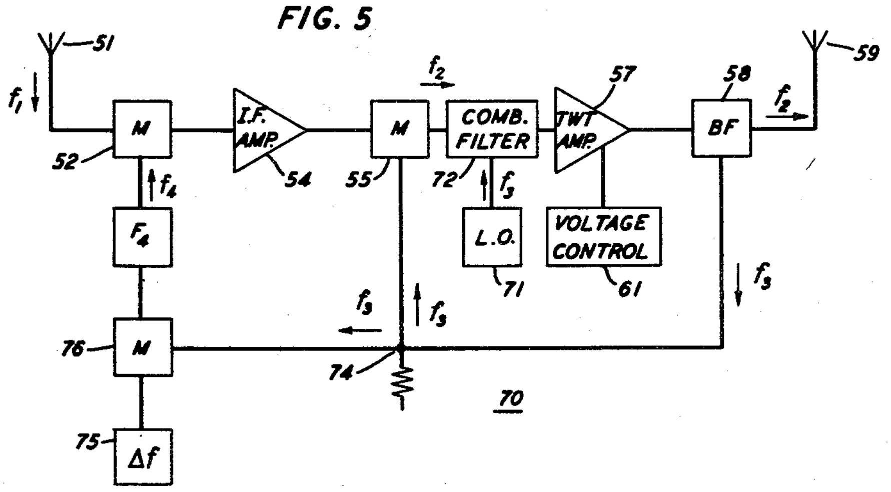

FIG. 5 illustrates, in block diagram form, an alternative application for a traveling wave tube utilizing a collector voltage control circuit of the types embodied herein in a microwave repeater 70. The block circuits in this repeater which correspond to those of repeater 50 are identified by like reference numerals. Repeater 70 differs from repeater 50 primarily in the use of a low power local oscillator 71 which, through a frequency combining filter 72, supplies oscillatory input drive to the traveling wave tube at a frequency $f_3$. Signal drive at a frequency $f_2$ is of course also supplied to the traveling wave tube from the up-converter 55. The output of the traveling wave tube at frequency $f_3$, obtained from the branching filter 58, is applied to the up-converter 55, such as through a directional coupler 74. Since it is generally desired that the oscillatory energy applied to the down-converter 52 be at a frequency other than $f_3$, a very low power frequency shift oscillator 75 is utilized to provide a frequency which, when applied in a mixer 76 with $f_3$, produces a desired oscillatory frequency at $f_4$. This frequency is then preferably passed through a filter $f_4$ before being applied to the down-converter 52.

With this arrangement, it is seen that the traveling wave tube is utilized in the high power state as the amplifier for both the signal energy at a frequency $f_2$ and the oscillatory energy at a frequency $f_3$ whereas in the low power state the tube is utilized as an amplifier for only the oscillatory energy. In practice suitable limiting circuitry would generally be employed to maintain the level of oscillatory power at a substantially constant level whether the collector was biased at a high or low operating voltage.

Advantageously, a satellite repeater of the type depicted in FIG. 5 would normally require oscillatory power of the order of only 5 to 10 milliwatts whereas the amplified signal power would generally be of the order of 1 to 5 watts. Accordingly, from the curves depicted in FIG. 2, it is seen that the collector voltage can be reduced considerably with the voltage control circuit 61 in accordance with the principles of the invention so as to conserve direct-current power whenever signal energy is not received by the repeater for amplification.

It is to be understood that the specific embodiments described herein are merely illustrative of the general principles of the instant invention. Numerous other structural arrangements and modifications may be devised in the light of this disclosure by those skilled in the art without departing from the spirit and scope of this invention.

What is claimed is:

1. A microwave circuit comprising a traveling wave tube with an electron gun and collector for producing and directing an electron beam along an extended path therebetween, a wave interaction circuit positioned in coupling relation with said beam, said circuit normally exhibiting an increase in current with an increase in signal input power for a given value of collector voltage, input means for coupling signal energy to said wave interaction circuit for amplification, output means for abstracting the power produced by said traveling wave tube, and voltage control means responsive to changes in current in said interaction circuit for increasing and decreasing the collector voltage in direct relation with an increase and decrease respectively in current in said interaction circuit.

2. A microwave circuit comprising a traveling wave tube with an electron gun and collector for producing and directing an elcetron beam along an extended path therebetween, a wave interaction circuit positioned in coupling relation with said beam, said circuit normally exhibiting an increase in current with an increase in signal input power for a given value of collector voltage, input means for coupling signal energy in said wave interaction circuit for amplification, output means for abstracting the power produced by said traveling wave tube, and voltage control means responsive to changes in current in said interaction circuit, said means including a collector power supply with a saturable transformer therein, the degree of transformer saturation varying inversely and the induced secondary voltage varying directly with and in response to changes in the current in said interaction circuit thereby increasing and decreasing the collector voltage in direct relation with an increase and decrease respectively in current in said interaction circuit.

3. A microwave circuit in accordance with claim 2 wherein said saturable transformer includes a saturable control winding and wherein said control circuit further includes a direct-current amplifier having two voltage inputs and one output, one input comprising a biasing voltage directly responsive to and varying directly with changes in current in said interaction circuit, the other input comprising a reference voltage, the resultant of these two input voltages producing an output from said amplifier which produces a unidirectional current in said control winding which varies inversely with the current in said interaction circuit.

4. A microwave circuit in accordance with claim 2 wherein said saturable transformer includes a dual control winding with a grounded center tap, one terminal of said winding being connected in series with the negative terminal of a reference voltage supply and the other terminal of said winding being connected in series with the negative terminal of a helix power supply.

5. A mocrowave circuit in accordance with claim 4 further comprising short-circuiting means for preventing unidirectional current in said helix supply which may exceed said reference current from flowing through said dual control winding, said means comprising a diode positioned across the terminals of said dual control winding with the anode of said diode connected to the negative terminal side of said reference power supply, and said microwave circuit further including filter means for isolating any undesired power line signals from said interaction circuit, reference supply and diode, said filter means comprising two inductors interposed between the terminals of said control winding and the negative terminals of said reference and helix supplies, respectively, with a capacitor connected across the ends of said inductors opposite said control winding terminals.

6. A microwave circuit comprising a traveling wave tube with an electron gun and collector for producing and directing an electron beam along an extended path therebetwen, a wave interaction circuit positioned in coupling relation with said beam, said circuit normally exhibiting an increase in current with an increase in signal input power for a given value of collector voltage, input means for coupling signal energy to said wave interaction circuit for amplification, output means for abstracting the power produced by said traveling wave tube and voltage control means responsive to the presence or absence of signal energy and for effecting a change in collector voltage between at least two predetermined levels, said control means including a collector power supply with a transformer having a saturable control winding, the degree of saturation of said winding varying inversely with and in response to changes in the current in said interaction circuit for establishing a maximum value of collector voltage when the interaction current is maximum and a minimum value collector voltage when the current in said interaction circuit is minimum.

7. A microwave repeater comprising means for receiving signal energy at a frequency $f_1$, down-converter means providing an I–F signal frequency, I–F amplifier means, up-converter means for shifting said I–F frequency to a higher transmiting microwave frequency, a traveling wave tube for amplifying said microwave signal energy at said transmitting frequency, said tube including an electron gun and collector for producing and directing an electron beam along an extended path adjacent an interaction circuit positioned therebetween, said interaction circuit normally exhibiting an increase in current with an increase in signal input power for a given value of collector voltage, means connected to the output of said traveling wave tube for radiating said amplified microwave signal energy at the transmitting frequency, and collector voltage control means responsive to changes in current in said interaction circuit for increasing and decreasing the collector voltage in direct relation with an increase and decrease in current in said interaction circuit.

8. Apparatus in accordance with claim 7 wherein said control means includes a collector power supply with a saturable transformer therein, the degree of saturation of said transformer varying inversely with the current in said interaction circuit and the induced secondary voltage of said transformer varying directly with the degree of transformer saturation.

9. Apparatus in accordance with claim 8 further including a microwave feedback loop connected between the output of said traveling wave tube and an input of at least said up-converter and the input of said traveling wave tube, said feedback loop including signal dividing means, filter means and limiter means for initiating and sustaining oscillations at a frequency $f_3$ in said traveling wave tube, said oscillations comprising the source of local oscillator power for at least said up-converter at a level which is maintained substantially constant regardless of variations in current in said interaction circuit and variations in the saturation of said transformer.

10. Apparatus in accordance with claim 8 further including a low power source of oscillations at a frequency $f_3$ applied to the input of said traveling wave tube continuously, frequency separation means at the output of said traveling wave tube for isolating said amplified signal energy from said amplified oscillatory energy and microwave feedback means for applying the oscillatory energy of frequency $f_3$ at least as the primary source of local oscillator power to said down and up-converters at a level which is maintained substantially constant regardless of variations in current in said interaction circuit and variations in the saturation of said transformer.

11. A radio repeater for receiving and transmitting an intelligence signal, said repeater including at least one frequency converter, a source for producing local oscillations for said frequency converter, a traveling wave tube power amplifier for receiving the output of said frequency converter, and frequency separation means at the output of said traveling wave tube for separating the intelligence signal and the local oscillations, said repeater being characterized in that said local oscillations from said source are fed through said traveling wave tube amplifier before being applied to said frequency converter at the local oscillator frequency.

12. A radio repeater for receiving and transmiting an intermittent signal, said repeater including a traveling wave tube including means for directing an electron beam along an interaction circuit to a collector, means for conserving power supplied to said collector in the absence of said signal comprising means for sampling the current in said interaction circuit and for decreasing the voltage applied to said collector in response to decrease in said current.

13. A radio repeater for receiving and transmiting an intermitent intelligence signal, said repeater including at least one frequency converter, a traveling wave tube power amplifier for receiving the output of said converter, means for producing local oscillator signal power for said converter including said traveling wave tube and means for passing said local oscillator signal through said traveling wave tube amplifier before applying said oscillator signal to said converter at the local oscillator frequency, and voltage control means responsive to the output of said frequency converter for increasing the amplification of said traveling wave tube amplifier in the presence of said intelligence signal to that high power level required to amplify said intelligence signal and for reducing the amplification of said traveling wave tube amplifier in the absence of said intelligence signal to that low power level required to produce said oscillator signal.

14. A radio repeater for receiving and transmiting an intermittent intelligence signal, said repeater including at least one frequency converter, a traveling wave tube power amplifier for receiving the output of said frequency converter, a source for producing local oscillator signal for said frequency converter, means for passing said local oscillator signal through said traveling wave tube amplifier for amplification before applying said oscillator signal to said converter at the local oscillator frequency, and voltage control means responsive to the output of said frequency converter for increasing the amplification of said traveling wave tube amplifier in the presence of said intelligence signal to that high power level required to amplify said intelligence signal and for reducing the amplification of said traveling wave tube amplifier in the absence of said intelligence signal to that low power level required to pass said oscillator signal.

References Cited in the file of this patent

UNITED STATES PATENTS 2,611,832 Lapostolle .............. Sept. 23, 1952
2,770,722 Arams .................. Nov. 13, 1956